United States Patent [19]

Nieminen et al.

[11] 4,199,161
[45] Apr. 22, 1980

[54] TRASH CART

[76] Inventors: Sheralyn L. Nieminen; Duane A. Nieminen, both of 1820 Mile Pond, Lake Orion, Mich. 48035

[21] Appl. No.: 903,500

[22] Filed: May 8, 1978

[51] Int. Cl.² .................................................. B62B 19/00
[52] U.S. Cl. ......................................... 280/8; 280/47.24
[58] Field of Search ............... 280/8, 63, 47.26, 47.34, 280/47.36, 79.2

[56] References Cited

U.S. PATENT DOCUMENTS

| | | | |
|---|---|---|---|
| 3,241,750 | 3/1966 | Brighton | 280/47.26 X |
| 3,366,397 | 1/1968 | Zeilstra et al. | 280/47.26 |
| 3,402,848 | 9/1968 | Busey | 280/47.26 X |
| 3,866,936 | 2/1975 | Hedger | 280/47.26 |
| 3,904,218 | 9/1975 | Kostic | 280/79.2 |

*Primary Examiner*—John A. Pekar
*Assistant Examiner*—Norman L. Stack

[57] ABSTRACT

A trash cart for storing garbage bags comprises an open-top container having a bottom and a continuous substantially vertical side wall having a top edge and a hollow domed cover having an inwardly-turned rim, the inner edge of the rim extending to the top edge of the side wall, the cover overhanging the container by substantially to the extent of the rim, whereby, when the cover is closed on the container, the cart has the appearance of a large mushroom or toadstool, the cart having wheels at the rear end and runners on the bottom for transport over snow and a flexible strap/handle for pulling the cart, the cover having an opening to receive the handle in a manner to prevent opening of the cover by animals, the cover being hinged to the container and a brace for the hinge forming a compartment in the cover for extra empty garbage bags, the container having a capacity to store a plurality of filled garbage bags and the domed cover being capable of storing at least one full garbage bag.

1 Claim, 10 Drawing Figures

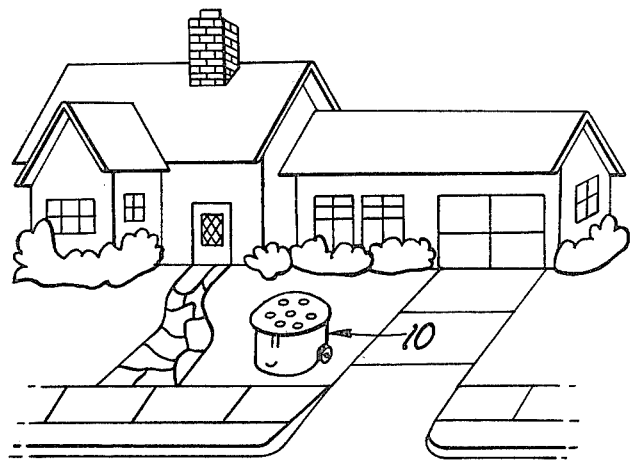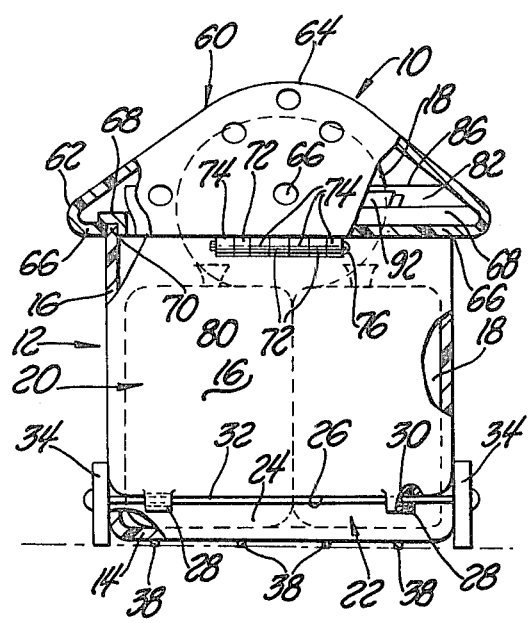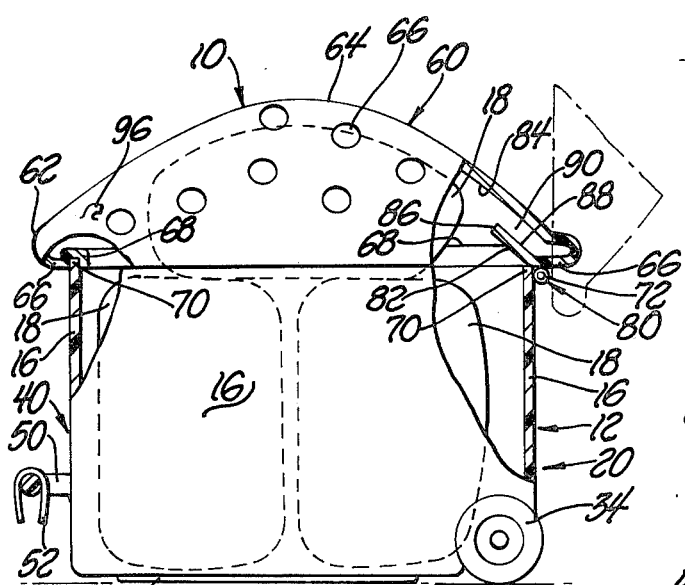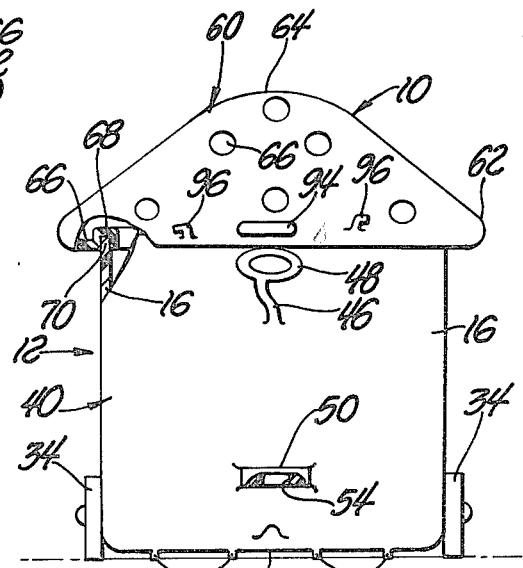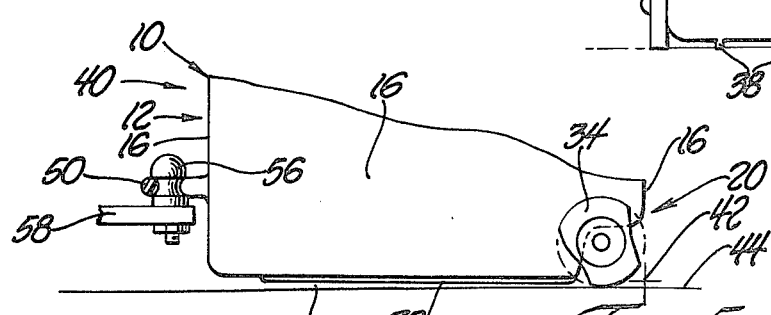

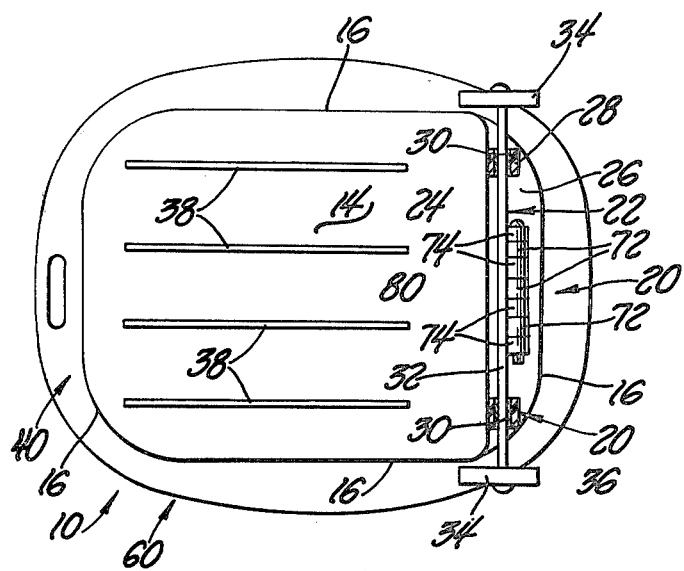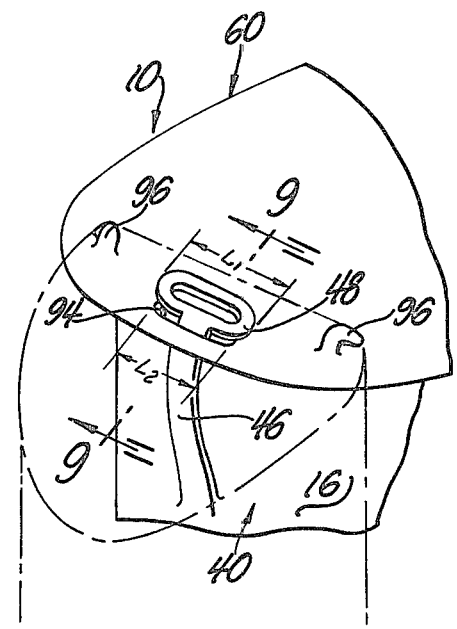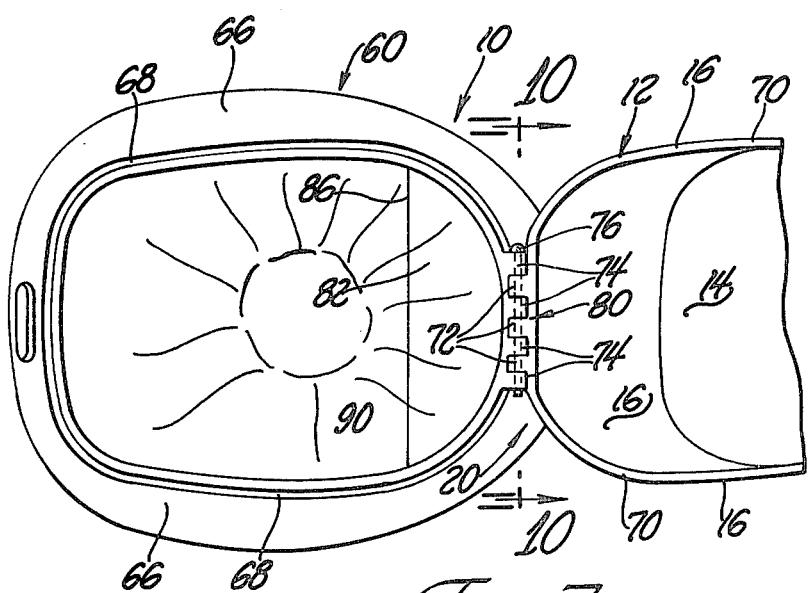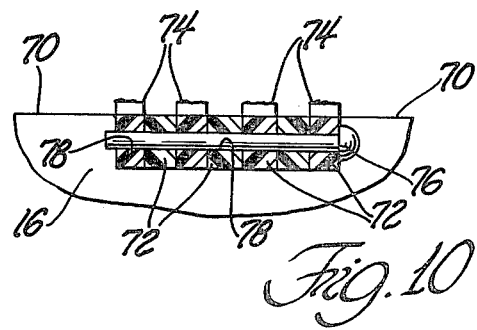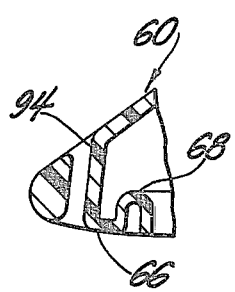

TRASH CART

BACKGROUND OF PRIOR ART

This invention relates to the technical field of trash containers and trash storage and disposal.

Trash collection, particularly from residences, has been transformed, in the last decade or so, to a system where the resident collects the usual domestic trash, garbage and the like in so-called plastic "garbage" bags and deposits them along the street for collection one day a week by personnel operating a "garbage" truck. The garbage truck operator does not, for example, enter the premises to collect the trash; rather, the truck travels along the street and one operator throws the garbage bags into the truck, or empties the contents of the garbage cans deposited there into the truck.

Since most garbage collection occurs only once a week, the resident must store the filled garbage bags somewhere on his premises and then deposit them at the collection point near the street on "garbage" day.

Such a system presents some practical problems, as follows, which listing is not intended to be all-inclusive:

1. There is an odor problem with garbage bags or cans stored for a week, especially in warm weather.
2. Flies and other insects are attracted to stored garbage bags or cans containing garbage.
3. Animals such as dogs, cats, raccoons, etc. are also attracted to such bags containing garbage, and they often tear the bags open and scatter the contents thereof around the premises, which is unsightly and unsanitary.
4. Storing of individual garbage bags near the residence is unsightly and unsanitary, as is depositing the same along the street once a week.
5. The well-known metal or plastic "garbage" cans are just as unattractive as the individual garbage bags, and they are particularly unsanitary when used for garbage without a plastic bag or other liner. Further, they are unstable and can be easily tipped over and uncovered by animals.
6. Another problem with use of garbage cans is that a single household requires two or more, and they have to be transported (usually requiring more than one trip) to the street-side collection point. Also, they are soon damaged and deformed by collection personnel in emptying the same, so that the covers soon don't fit, allowing emission of odors, infestation by flies, etc.

BRIEF SUMMARY OF INVENTION

Accordingly, some of the objects of the invention are as follows:

1. To provide an improved, more efficient trash/garbage collection and disposal method and apparatus.
2. To provide an improved, relatively inexpensive and durable trash container adapted to receive and store a plurality of filled plastic garbage bags.
3. To provide a trash cart shape trash container that can be molded or otherwise formed from a durable material such as polyethylene or fiber glass, to better withstand the elements, permit cleaning, etc.
4. To provide a trash cart that can easily hold five 30-gallon bags filled with trash, which is about the maximum weekly amount of trash from a household. It is important that such a cart is too large for a trash collector to manhandle, which is a main reason why smaller garbage cans get damaged.
5. To provide a trash cart that is fitted at its rear end with a set of wheels that extend only very slightly below the bottom of the container, which is formed with runners. Thus, slightly raising the front end, as by its integrally molded strap handle, allows the container to be transported on its wheels without scraping the bottom. To facilitate this, the bottom is transversely cut away near the wheels, to eliminate the bottom rear corner that would drag when the front end is raised. In the wintertime, the container can be pulled over the ice and snow on its runners, without significant interference from the wheels, which may extend below the bottom not much further than the runners.
6. To provide a trash cart front is formed with a security loop by which the cart can be secured with a chain or cable to prevent theft of the cart. The loop can be designed and positioned at the front of the container at a level such that it can be fitted over the ball of a ball-type trailer hitch for transporting the cart, as in rural areas where the road-side collection point is some distance from the house.
7. To provide a non-metallic trash cart that is formed with a cover that is secured to the container by a hinge including cooperating hinge members integrally molded with the container and cover.
8. To provide a covered non-metallic molded trash cart wherein the container is formed with a bottom and substantially vertical sides, the container having a generally rounded rectangular cross-section, and the cover being formed generally dome-shaped, the cover overhanging the container to an extent such that the cart resembles a mushroom or toadstool. Such a structure, which may be colored or painted to complement the residence, is much preferred aesthetically over garbage cans or bags.
9. To provide a hinged, dome-cover trash cart wherein the dome is of sufficient volume to accommodate additional trash therein, as opposed to a flat cover, and wherein a hinge member support rib provides a storage shelf or compartment for storage of a week's supply of empty garbage bags.
10. To provide the domed cover with an opening at the front end adapted to receive the handle in a manner to require deliberate manipulation for its removal, so as to reduce the possibility that animals may do so.
11. To provide the domed cover with an inwardly turned base rim having a lip seal to receive the top edge of the container.

These and other objects and advantages of the invention will become more apparent by reference to the following Detailed Description of Invention and the appended Drawings.

BRIEF DESCRIPTION OF DRAWINGS

FIG. 1 is a perspective view of a residence with a trash cart embodying the invention at the road-side garbage or trash collection point.

FIG. 2 is a side elevational view of a trash cart embodying the invention, with portions thereof cut away and in cross-section.

FIG. 3 is a front elevational view of the trash cart shown by FIG. 2, with portions thereof cut away and in cross-section.

FIG. 4 is a rear elevational view of the cart shown by FIG. 2, with portions thereof cut away and in cross-section.

FIG. 5 is a fragmentary portion of the side elevational of FIG. 2, illustrating functional features of the invention.

FIG. 6 is a bottom plan view of the cart shown by FIG. 2, with portions thereof cut away and in cross-section.

FIG. 7 is a plan view of the underside of the cover of the cart shown by FIG. 2, with a fragmentary portion of the container being shown, in a position representative of maximum opening of the cover.

FIG. 8 is an enlarged fragmentary perspective view illustrating functional features of the trash cart shown by FIG. 2.

FIG. 9 is an enlarged fragmentary cross-sectional view, taken on the plane of line 9—9 of FIG. 8.

FIG. 10 is an enlarged cross-sectional view, taken on the plane of line 10—10 of FIG. 7.

DETAILED DESCRIPTION OF THE INVENTION

Referring now to the drawings, FIG. 1 illustrates a residence having a trash cart 10 embodying the invention located at the road-side garbage or trash collection point.

As referred to above, the cart 10 would normally be kept at some other (garage, backyard, etc.) location during the week, where the trash is bagged and stored in the cart, for removal to the collection point on the day each week that trash is collected.

Reference will now be made to FIGS. 2-10 for a detailed description of a preferred embodiment of the trash cart 10.

As best seen in FIGS. 2-4, 6 and 7, the cart 10 comprises a container 12 formed to provide a bottom 14 and substantially vertical sides 16. As seen in FIG. 6, the bottom, and thus the horizontal cross-sectional shape of the container, is generally a rectangle with rounded corners. There is nothing critical about this configuration, however, so that it can be a circular or an oval or eliptical shape, although it is preferable that it have a greater front-to-rear dimension, as will be explained. Further, the container is of sufficient dimension to easily receive a plurality (preferably at least four) of filled 30-gallon garbage bags 18.

As stated, the container 12 is preferably molded or otherwise formed in one piece from a durable weather-proof material such as polyethylene or fiber glass. It is also preferable that the container 12 have a width-height relationship such that it has a characteristic of "squatiness", making it difficult or awkward to manhandle and for animals to tip over. For this purpose, as seen in the drawings, the height of the container 12 is shown as being approximately the same as its width, although this is not a specific requirement. In any event, it is apparent that container 12 is more stable than the well-known round garbage can.

Referring to FIGS. 2, 4 and 6, it will be noted that the bottom of the rear end 20 of the container 12 is formed with a generally square step or recess 22 having a vertical wall 24 and a horizontal wall 26. Integral axle bearing members 28 extend from walls 24/26 and are formed with journal openings 30 to receive the axle 32. Half rubber or other wheels 34 are fitted in any suitable manner on axle 32. The members 28 may be provided with an inexpensive replaceable metallic or other sleeve bearing 36 to prevent wear of members 28, the object being to provide a very simple and inexpensive, but durable assembly.

The bottom 14 is formed with spaced ribs or runners 38 extending lengthwise from the rear end 20 to the front end 40 of the container 12.

It will be noted, in FIG. 5, that the recess 22 eliminates the point 42, which would be on the bottom rear corner of the container 12, if the rear side wall 16 and bottom 14 were extended, and which would pivot downwardly about the axle 32, and possibly make contact with the support surface 44 when the front end 40 of the container is lifted for transport. However, since plastic bags can be distorted, recess 22 does not materially reduce the container volume. With this structure, the wheel mounting can be such that the wheels do not extend substantially below the plane of bottom 14, and the cart 10 can be transported either on its wheels 34 on a hard surface, or on its runners 38 over snow, without material interference from the wheels 34.

Referring now to the front end 40 of the cart 10, it will be noted (FIGS. 3 and 8) that the container 12 is preferably molded with an integral flexible strap 46 having a handle grip 48 formed at, and extending laterally at, the free end of strap 46. It is apparent that strap 46/handle 48 may be used to manually pull cart 10 forward as desired. However, handle 48 has another purpose to be described.

Front end 40 is also preferably integrally molded with a security loop 50 by which cart 10 may be secured against theft to to any suitable anchor as by a cable or chain 52.

Referring again to FIG. 5, it will be noted that loop 50 has an opening 54 and is disposed at a level such that when it is placed over a ball 56 of a ball-type trailer hitch 58 on a truck or other vehicle, the runners 38 at the bottom of the container 12 will be raised off the support surface, as indicated by space 60.

Thus, it will be seen that the cart 10 can be pulled to and from the collection point either manually, by handle grip 48, or with a hitch 58, for example.

It will be further observed that the container is shown as having a capacity of four filled garbage bags and that it is slightly longer front to rear than it is wide, and that the runners 38 extend lengthwise. While this is not necessary, the container is somewhat more stable when it is pulled lengthwise; especially in snow for example.

FIGS. 2-4 and 6-8 illustrate the details of the cover 60 for the container 12. It will be noted that the cover 60 is dome-shaped, extending from the outer periphery 62 to the apex 64. The outer periphery 62 substantially overhangs the walls 16 of the container, the overhanging being enclosed by the inwardly extending rim 66, which terminates at its inner end in a lip seal 68. The seal 68 receives the top edge 70 of the wall 16, preferably snugly, and it serves to prevent escape of odors from the cart when it is filled with refuse bags.

The rear wall 16 is formed at the top edge 70 thereof with a first hinge member including elements 72, while the cover 60 is formed at the inner edge of rim 66 with a second hinge member including elements 74. Where the container 12 and cover 60 are molded from plastic-type material, the elements 72 and 74 are molded integrally therewith, and a hinge pin 76 is inserted through the aligned openings 78 therein. The pin 76 may, of course, be a molded plastic pin, or a non-rusting metal pin, such as one made from aluminum rod.

The molded cover hinge member, and thus the hinge assembly 80, may be made more rigid by providing an integral molded brace member 82 that extends laterally across the inner width of the cover 60 and inwardly from the hinge member elements 74 toward the dome 64, generally parallel to the sloping inner surface of rear wall 84 of the cover 60. The free edge 86 of the brace 82 is spaced from the wall 84, to provide a shelf 88 or compartment 90 of sufficient capacity to receive a week's supply of garbage bags 92. Thus, the brace 82 for the hinge cover/hinge member serves the additional purpose of a shelf or wall for compartment 90.

Referring now to FIGS. 6–9, it will be noted that the overhang portion 66 at the front end of the cover is formed with a mail slot-type opening 94. The handle grip portion 48 at the end of the strap 46 is of a thickness such that it can pass through the slot opening 94 from the position of FIG. 3 to the position of FIG. 8. However, the length L1 of grip portion 48 exceeds the length L2 of the slot 94, so that it cannot be removed from the slot by pulling axially on the strap 46, for example. Also, grip portion 48 cannot be passed through the slot 94 with the grip portion parallel to the rim 66. Rather, to insert or remove the grip portion 48 from the slot, it must be inserted or removed one end first. This is a deliberate operation of which a human is easily capable, but which an animal, such as a dog or raccoon, is not normally capable. Thus, in the FIG. 8 condition of the handle 48, the cart is secured against opening by animals that tear open exposed garbage bags or remove the lids from prior art garbage cans. The cart 10 can be pulled by grip portion 48 whether or not it is inserted through the slot 94.

It will be noted, in FIGS. 2 and 4, that the hollow, domed cover 60 has sufficient volume to store at least one filled garbage bag 18, which, along with at least four filled bags in the container 12, is about a week's supply of bags.

The front of the cover 60 is also molded with rigid spaced integral hook elements 96 extending upwardly and outwardly in a manner such that the open end of a garbage bag 18 can be hooked thereon (see FIG. 8) for purposes of (a) storing partially filled bags, which can be temporarily closed, until it is filled and tied, by twisting the lower end of the bag, while the upper end is still on the hooks 96, or (b) filling empty or partially filled bags. With the rigid molded hook structure, moving spring clip parts, etc., subject to eventual failure are eliminated.

As seen in FIG. 2, the extent to which the cover can be opened is limited to the broken line substantially-vertical position by engagement of the overhang portion with the rear vertical wall 16.

It will be seen from the above description that a trash cart 10 embodying the invention can be a rugged, essentially two-piece (container 12 and cover 60, plus only the wheel assembly and hinge pin 76) molded plastic design that is very easily assembled and very durable. As such, it can be formed of any desired color or specific configuration, dimension, etc.

For a small household, the mushroom (or toadstool) overhanging cover trash cart configuration, with lower container 10 and hinged domed cover 60, can be formed with a capacity less than the five-bag capacity shown. That is, it could have a one-bag capacity, wherein the top portion of the single full bag would be received in the domed cover. However, for the average household, a capacity of more than one filled bag is undoubtedly desirable.

A trash cart such as that shown and described, as an example of a preferred embodiment of the invention, provides the recited objects and advantages of the invention.

While a preferred embodiment of the invention has been shown and described in such detail as to enable one skilled in the art to practice the same, modifications thereof are possible, and no limitations are intended, except as recited in the following claims.

What I claim as my invention is:

1. A trash cart, said cart being of molded plastic or similar non-metallic construction and comprising a container having a bottom and substantially vertical side walls having a continuous top edge and a domed cover extending from its outer periphery to a peak and having an inwardly turned rim at the bottom thereof, the inner periphery of said rim substantially overlying said upper edge of said container wall, said rim overhanging said container wall to substantially the extent of said rim, whereby said cart has the appearance of a large mushroom or toadstool, said upper edge and said rim being formed with a front end and a rear end, said cover being hingedly connected to the rear end top edge of said container by hinge cooperating elements formed integrally with said container and said cover, the bottom rear portion of said container being molded so as to eliminate the transverse bottom rear corner thereof and to provide means for mounting wheels for transporting said cart, said bottom of said container being formed with front-to-rear runners for transporting said container on snow and said wheel mounting being such that the wheels extend below said runners only a sufficient distance to transport said cart on said wheels on hard flat surfaces without scraping said runners thereon, said container being formed at said front even with a security loop of sufficient dimension so that it can be applied over the ball of a ball-type trailer hitch, said container being further formed with or having attached thereto a flexible strap handle having a laterally-extending grip portion at the free end thereof, said cover being formed at the front overhanging portion with a mailslot-type opening to receive said grip portion, said grip portion being longer than said opening so that animals are less likely to pull said grip portion from said opening to open said cover.

* * * * *